(12) United States Patent
Ueno

(10) Patent No.: US 9,313,325 B2
(45) Date of Patent: Apr. 12, 2016

(54) TELEPHONE TRANSMISSION SYSTEM, TELEPHONE TRANSMISSION SERVER AND DISPLAY UNIT

(71) Applicant: Panasonic Corporation, Osaka (JP)

(72) Inventor: Takeshi Ueno, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 11 days.

(21) Appl. No.: 14/373,086

(22) PCT Filed: Dec. 19, 2012

(86) PCT No.: PCT/JP2012/008096
§ 371 (c)(1),
(2) Date: Jul. 18, 2014

(87) PCT Pub. No.: WO2013/111238
PCT Pub. Date: Aug. 1, 2013

(65) Prior Publication Data
US 2014/0364098 A1    Dec. 11, 2014

(30) Foreign Application Priority Data

Jan. 23, 2012 (JP) .................................. 2012-010902

(51) Int. Cl.
*H04M 3/00* (2006.01)
*H04M 5/00* (2006.01)
(Continued)

(52) U.S. Cl.
CPC ........ *H04M 3/42068* (2013.01); *H04M 1/0202* (2013.01); *H04M 3/42008* (2013.01); *H04M 11/025* (2013.01)

(58) Field of Classification Search
USPC ................................. 379/284, 285; 455/415
See application file for complete search history.

(56) References Cited

U.S. PATENT DOCUMENTS 5,725,428 A * 3/1998 Achmuller .............. G07F 17/34
273/143 R

FOREIGN PATENT DOCUMENTS

| CN | 2605708 Y | 3/2004 |
| JP | 2006-184985 A | 7/2006 |

(Continued)

OTHER PUBLICATIONS

International Search report and Written Opinion for corresponding International Application No. PCT/JP2012/008096, dated Jan. 22, 2013.

(Continued)

*Primary Examiner* — Quynh Nguyen
(74) *Attorney, Agent, or Firm* — Renner, Otto, Boisselle & Sklar, LLP

(57) ABSTRACT

When a user B presses a button, a display unit generates a pseudo-random number based on a clock time of a first clock and a unique ID of the display unit, then displays the generated pseudo-random number on a liquid crystal display. Upon receiving a signal from a mobile telephone, a telephone transfer server receives information generated by operating the mobile telephone. Upon receiving the information, the telephone transfer server generates a pseudo-random number based on a clock time of a second clock and the unique ID of the display unit stored in advance, and determines whether or not the pseudo-random number so generated matches the pseudo-random number in the received information. In the affirmative case, the telephone transfer server connects the mobile telephone to a fixed telephone.

8 Claims, 16 Drawing Sheets

(51) Int. Cl.
*H04M 3/42* (2006.01)
*H04M 11/02* (2006.01)
*H04M 1/02* (2006.01)

(56) References Cited

FOREIGN PATENT DOCUMENTS

| JP | 2007-128230 A | 5/2007 |
|----|---------------|--------|
| JP | 2007-241546 A | 9/2007 |
| JP | 2008-210091 A | 9/2008 |
| JP | 2008-217678 A | 9/2008 |
| JP | 2009-100334 A | 5/2009 |
| JP | 2009-124394 A | 6/2009 |
| JP | 2010-177755 A | 8/2010 |

OTHER PUBLICATIONS

Chinese Office Action and Search Report for corresponding Chinese Application No. 201280067748.2, dated Oct. 23, 2015 with English translation.

* cited by examiner

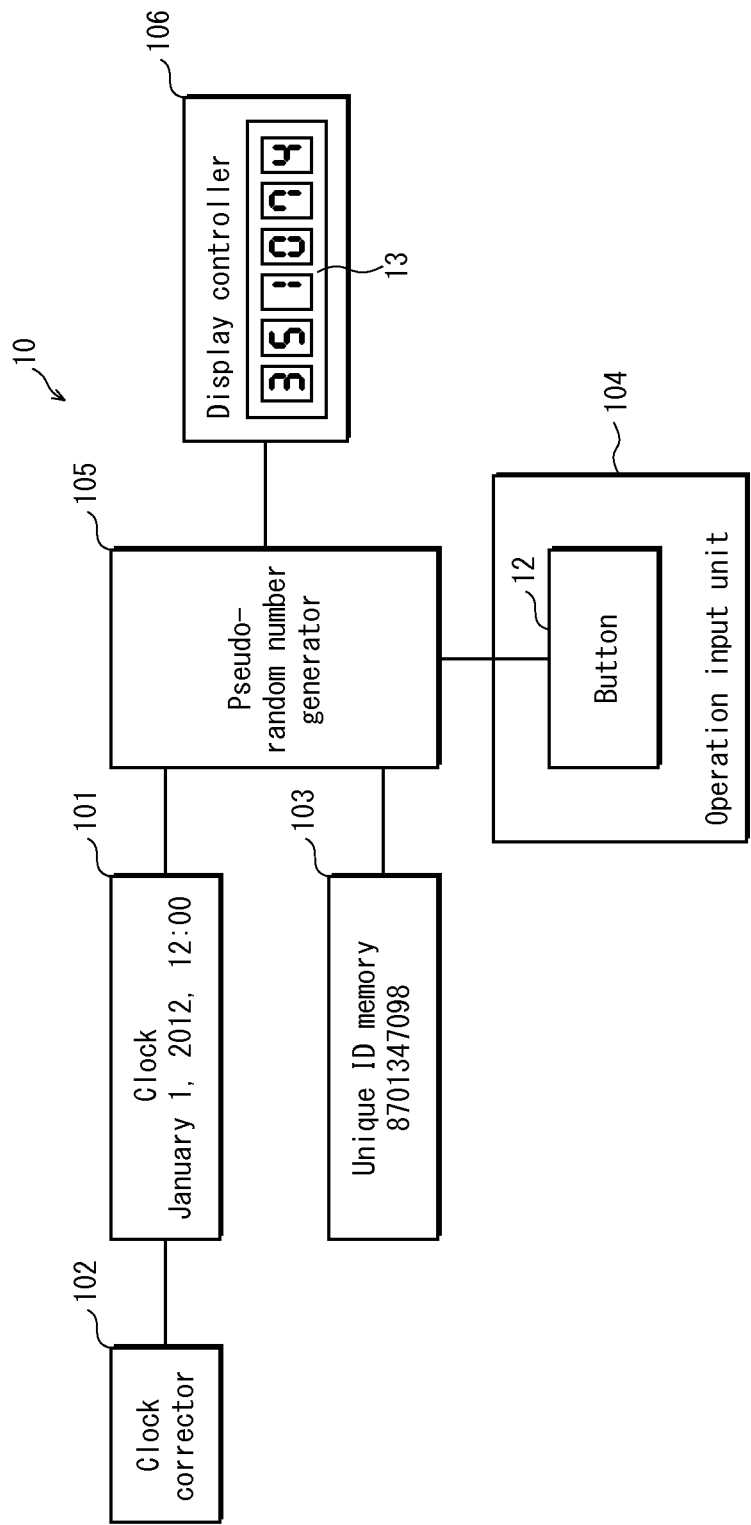

FIG. 5A

| Device number | Unique ID |
|---|---|
| 8709813223 | 9807180981 |
| 7183010314 | 8701347098 |
| 6700193259 | 5250806121 |
| 1323042876 | 2281224721 |
| ... | ... |

| Device number | Registration number | Transfer destination telephone number | Timestamp correction value |
|---|---|---|---|
| 8709813223 | 4812739047 | 080-1234-5678 | +1 |
| 7183010314 | 1231512334 | 06-8765-4321 | −1 |
| 6700193259 | 3592110576 | 090-3333-1234 | −3 |
| 1323042876 | 9370152433 | 03-1234-5555 | 0 |
| ... | ... | ... | ... |

| Number | Response message (Audio data) |
|---|---|
| 1 | Welcome to transfer service registration.<br>Please activate caller ID and call again. |
| 2 | Welcome to transfer service registration.<br>Enter the device number on your display unit and<br>press the pound key when finished. |
| 3 | Your device number is invalid. Enter the device number<br>on your display unit and press the pound key when finished. |
| 4 | Your device number is invalid. Please start over. |
| 5 | Press 1 to register, or press 2 to cancel a registration. |
| 6 | Your registration number is ######. Write this number<br>on your display unit. Press 1 to hear your number again,<br>or press the pound key to continue. |
| 7 | For confirmation, enter your registration number and<br>press the pound key when finished. |
| 8 | Your registration number is incorrect. Please start over. |
| 9 | Transfer service registration complete.<br>To cancel registration, please dial the registration telephone<br>number again. Thank you for using the service. |
| 10 | To cancel your registration, enter your registration number and<br>press the pound key when finished. |
| 11 | Your registration number is incorrect. Enter your registration<br>number and press the pound key when finished. |
| 12 | Your registration number is incorrect. Please start over. |
| 13 | Transfer service cancellation complete.<br>To register again, please dial the registration telephone number.<br>Thank you for using the service. |

FIG. 7

| Number | Response message (Audio data) |
|---|---|
| 1 | Welcome to the transfer service menu.<br>Please activate caller ID and call again. |
| 2 | Welcome to the transfer service menu.<br>Enter the registration number on the display unit and press the pound key when finished. |
| 3 | Invalid registration number. Enter the registration number on the display unit and press the pound key when finished. |
| 4 | Invalid registration number. Please start over. |
| 5 | Press the button on the display unit.<br>Enter the confirmation number that appears on the liquid crystal display and press the pound key when finished. |
| 6 | Verification unsuccessful. Please start over. |
| 7 | Verification complete. Your call is being transferred.<br>Please hold. |
| 7' | Verification complete. Your call is being dialed.<br>Please hold. |
| 8 | The transfer destination is busy. Please start over. |
| 9 | You have one minute to speak. |
| 10 | The transfer destination is not responding. Please start over. |

TELEPHONE TRANSMISSION SYSTEM, TELEPHONE TRANSMISSION SERVER AND DISPLAY UNIT

TECHNICAL FIELD

The present disclosure pertains to a telephone transmission system for communicating with a visitor.

BACKGROUND ART

The spread of mobile telephones has enabled visitors to announce their arrival at a destination by making a call from their own mobile telephone to a mobile telephone or fixed telephone belonging to a resident being visited, without requiring an intercom.

When a mobile telephone in place of an intercom, the resident cannot easily determine whether or not the visitor is actually present at their home. Also, a visitor who does not know the telephone number of the resident is unable to announce their visit.

As such, when a mobile telephone is used instead of an intercom, a system is sought that enables determination of whether the visitor has actually arrived, and enabling any visitor to announce their visit without requiring the resident to publicise their telephone number.

Patent Literature 1 discloses an intercom system using a mobile telephone terminal. This system includes a mobile telephone terminal owned by a visitor, an entrance device installed at an entrance, an indoor device installed indoors, and a mobile telephone terminal owned by a resident.

The visitor uses their mobile phone terminal to connect to the entrance device. The entrance device then reads the telephone number of the visitor's mobile telephone device and notifies the indoor device of the telephone number so read. The indoor device verifies the visitor by cross-referencing the received telephone number with a telephone number database. When the verification is successful, the indoor device wirelessly connects the visitor's mobile telephone terminal, which is connected to the entrance device, with the mobile telephone terminal belonging to the resident. This enables communication between terminals.

CITATION LIST

Patent Literature

[Patent Literature 1]
Japanese Patent Application Publication No. 2009-124394

SUMMARY OF INVENTION

Technical Problem

However, the technology of Patent Literature 1, cited above, requires that the entrance device and indoor device be installed at the home. Also, there is a problem in terms of the high cost of necessary communication between the entrance device and the indoor device, and between the indoor device and the resident's mobile telephone device.

In consideration of the above-described problem, the present disclosure aims to provide a telephone transmission system that does not require publicizing the resident's telephone number and enables verification of whether a visitor has arrived, with a simple and low-cost structure.

Solution to Problem

In order to accomplish this aim, the present disclosure provices a telephone transmission system comprising a display unit and a telephone transfer server, where the display unit includes: a first clock tracking a first clock time; a unique ID memory storing a unique ID; a first pseudo-random number generator generating a first pseudo-random number from the unique ID and the first clock time tracked by the first clock; and a display displaying the first pseudo-random number, and the telephone transfer server includes: a second clock tracking a second clock time; a unit information memory storing the unique ID of the display unit and a telephone number associated with the display unit; a receiver receiving information generated by an operation of a telephone; a second pseudo-random number generator generating, when the receiver receives the information, a second pseudo-random number from the second clock time tracked by the second clock and the unique ID stored in the unit information memory; a determiner making a matching determination to find a match between the information and the second pseudo-random number; and a communication controller connecting the telephone to the telephone number associated with the display unit when the matching determination is successful.

Advantageous Effects of Invention

According to the above-described configuration, the pseudo-random number is generated with a validity limit from the unique ID of the display unit and the clock time of the clock in the display unit, enabling verification of whether or not the visitor is actually present at the display unit location.

Also, given the lack of need for communication between the display unit and the telephone transfer server or between the display unit and the telephone, there is no need to provide a communication circuit in the display unit. The display unit is configured simply to generate and display the pseudo-random number, enabling low-cost realisation.

Also, the visitor need only make a call to the telephone transfer server, such that the resident is not required to reveal their telephone number to the visitor.

BRIEF DESCRIPTION OF DRAWINGS

FIG. 3 is a block diagram illustrating the internal configuration of the display unit 10.

FIGS. 5A and 5B illustrate data stored by a unit information memory.

FIG. 6 lists audio data stored in a registration IVR processor.

FIG. 7 lists audio data stored in a verification IVR processor.

DESCRIPTION OF EMBODIMENT

A telephone transmission system 1 pertaining to an Embodiment of the present disclosure is described below, with reference to the accompanying drawings.
(1. Overview)

Figure 1:
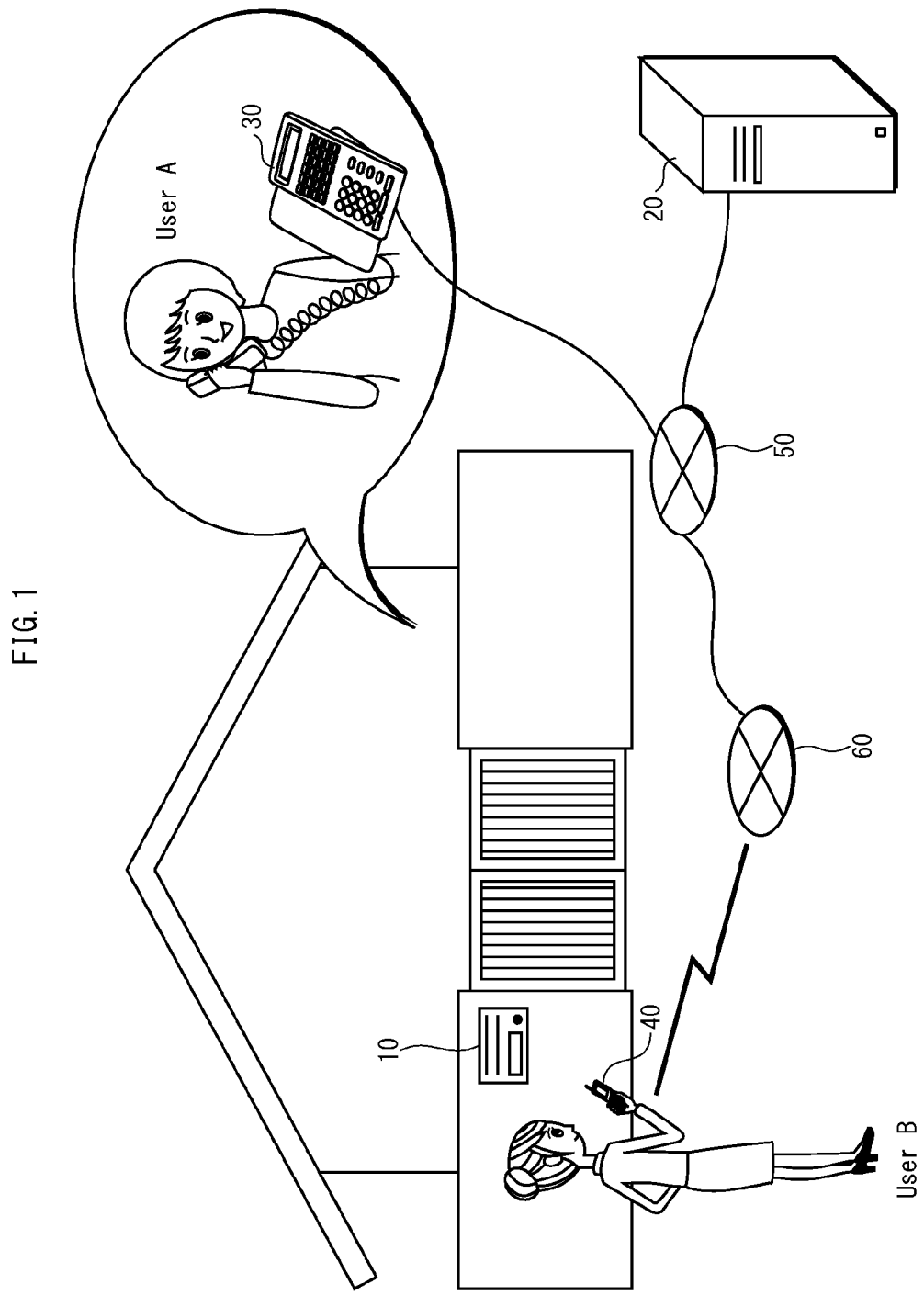
FIG. 1 illustrates the configuration of a telephone transmission system 1.

FIG. 1 illustrates the configuration of the telephone transmission system 1. As shown, the telephone transmission system 1 includes a display unit 10, a telephone transfer server 20, a fixed telephone 30, a mobile telephone 40, a public telephone network 50, and a mobile telephone network 60.

The display unit 10 is installed at the gate to the home of user A. A telephone number for the telephone transfer server 20 is written on the display unit 10 in a location visible from the outside. The fixed telephone 30 is installed within the home of user A and is connected to a public telephone network 50. The telephone transfer server 20 is owned by a communications provider. The mobile telephone 40 is owned by user B and is connected to the mobile telephone network 60.

When visiting the home of user A, user B dials the telephone number written on the display unit 10. This call connects to an automated voice response service of the telephone transfer server 20. User B then follows instructions from the automated voice response service to operate keys of the mobile telephone 40 and input information as displayed on the display unit 10. The telephone transfer server 20 verifies the information input by user B, and, when verification is successful, connects the call from user B to the fixed telephone 30. Accordingly, user B is able to communicate with user A about the visit.

In the present Embodiment, the communications provider owning the telephone transfer server 20 is assumed to manufacture and sell a large number of display units. User A has purchased one such display unit 10 and installed it at the gate.
(2. Configuration)

The following describes the respective configurations of the display unit 10 and the telephone transfer server 20.
(2-1. Display Unit 10 Configuration)

Figure 2A:
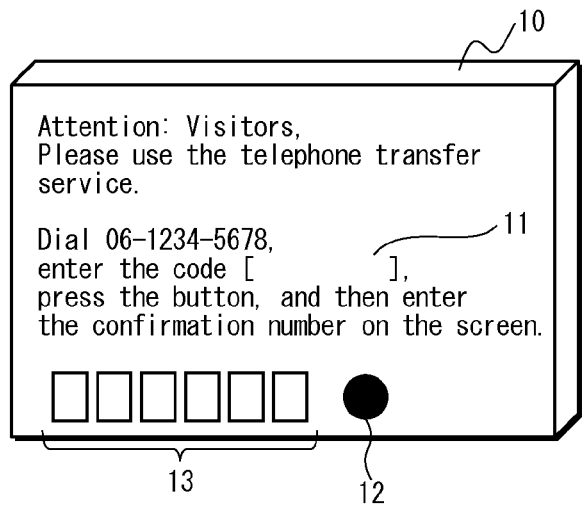
FIGS. 2A, 2B, and 2C are a perspective views of a display unit 10.
Figure 2B:
Figure 2C:
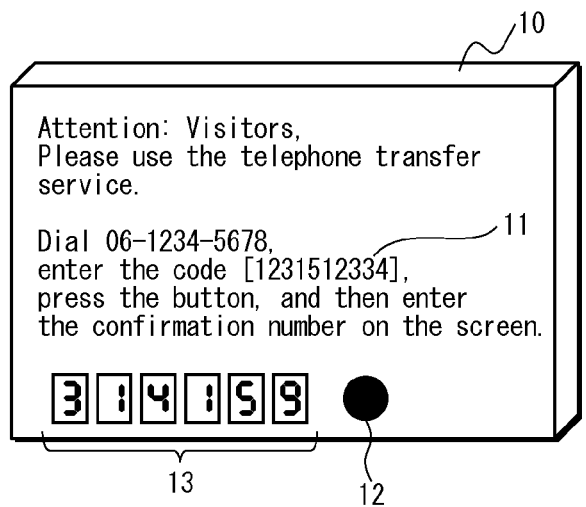

A perspective view of the display unit 10 is described first, with reference to FIGS. 2A, 2B, and 2C.

The display unit 10 has a casing made of moulded resin and contains a computer system in which various electronics are arranged, including a central processing unit (hereinafter, CPU), random-access memory (hereinafter, RAM), read-only memory (hereinafter, ROM), and so on. The size of the casing is typically on the order of 10 cm in height, 12 cm in width, and 1 cm in depth.

FIG. 2A is a perspective view of the display unit 10 when purchased by user A. The main screen of the display unit 10 (on which a button 12 and a liquid crystal display 13 are arranged) reads "Attention: Visitors, Please use the telephone transfer service. Dial 06-1234-5678, enter the code, press the button, and then enter the confirmation number on the screen." displayed as a text string.

This text string includes a registration number space 11, currently blank. User A registers the telephone number for the fixed telephone 30 in the telephone transfer server 20 and is notified of the registration number by the telephone transfer server 20. User A then uses a marker or similar writing implement to write the registration number in the registration number space 11.

FIG. 2B is a perspective view of the display unit 10 during use. The registration number space 11 now has the registration number 1231512334 written therein. In this state, the display unit 10 is installed at the entrance (e.g., at a front door, gate, outside wall, or similar) to the home of user A. The display unit 10 is beneficially installed so as to be fixed in place and not easily removed. The display unit 10 is driven by a button cell battery or similar primary cell battery serving as a power source, and does not require a connection to a commercial power source.

FIG. 2C is a perspective view of the display unit 10 when the button 12 has been pressed. Once the button 12 has been pressed, the liquid crystal display 13 displays a six-digit confirmation number. The confirmation number is generated randomly every time the button 12 is pressed.

Next, the internal configuration of the display unit 10 is described with reference to FIG. 3.

FIG. 3 is a functional block diagram showing the internal configuration of the display unit 10. As shown, the display unit 10 includes a clock 101, a clock corrector 102, a unique ID memory 103, an operation input unit 104, a pseudo-random number generator 105, and a display controller 106. The operation input unit 104 includes the button 12 described with reference to FIG. 2. The display controller 106 includes the liquid crystal display unit 13 similarly described with reference to FIG. 2.

The clock 101 measures the current time of day. Specifically, the clock 101 is able to measure the time to the year, month, day, hour, and minute.

The clock corrector 102 includes an antenna receiving a standard electric wave, demodulates a time code from the received standard electric wave, and uses data contained in the demodulated time code to correct the year, month, day, hour, and minute calculated by the clock 101.

The unique ID memory 103 is a non-volatile memory storing a unique ID allocated to the display unit 10. The unique ID is generated upon display unit 10 manufacture, and written into the unique ID memory 103. As described above, the display unit 10 is manufactured in plurality, and each display unit has a different unique ID allocated thereto. The unique ID of the display unit 10 is a ten-digit number such as 8701347089. Also, the information stored in the unique ID memory 103 is not readable from the outside. As such, user A and user B cannot know the unique ID stored in the unique ID memory 103.

The operation input unit 104 includes the button 12. Upon detecting that the button 12 has been pressed, the operation input unit 104 makes a pseudo-random number generation instruction to the pseudo-random number generator 105.

Upon receiving the pseudo-random number generation instruction from the operation input unit 104, the pseudo-random number generator 105 reads the unique ID from the unique ID memory 103. The current time is also read from the clock 101. The pseudo-random number generator 105 generates a timestamp string from ten digits representing the current time, specifically the year (two digits), the month (two digits), the date (two digits), the hour (two digits), and the minute (two digits).

The pseudo-random number generator 105 generates a verification string by concatenating the timestamp string and the unique ID. The pseudo-random number generator 105 then applies a pseudo-random number generation algorithm to the verification string to generate a pseudo-random number. The pseudo-random number generator 105 uses a one-way hash function (e.g., SHA-1) as the pseudo-random number generation algorithm. That is, the value output from the one-way hash function taking the verification string as input is used as the pseudo-random number. The pseudo-random number generator 105 outputs the pseudo-random number so generated to the display controller 106.

As described above, the unique ID of the display unit 10 is hidden information not known to user A and user B. Accordingly, in the present Embodiment, information that is hidden from the user serves as the basis for pseudo-random number generation, which has the effect of making the pseudo-random number generation algorithm difficult to guess.

The pseudo-random number generation algorithm used by the pseudo-random number generator 105 is not limited to being a one-way hash function. Any algorithm may be used, provided that the value generated thereby varies unpredictably as the timestamp string read from the clock 101 changes.

The display controller 106 includes the liquid crystal display 13 and a timer. Upon receiving the pseudo-random number from the pseudo-random number generator 105, the display controller 106 displays the received pseudo-random number on the liquid crystal display 13 as the confirmation number. The display controller 106 starts the timer and measures time beginning when the confirmation number is displayed, and clears the display on the liquid crystal display 13 after one minute.

This enables electric power consumption by the liquid crystal display 13 to be constrained. Also, as described above, the confirmation number is valid for one minute, given that the clock 101 measures time in increments of one minute. Therefore, there is no need to display the confirmation number any longer than one minute. Also, given that the confirmation number is only valid for one minute, user B must call the telephone transfer server 20 from the vicinity of the display unit 10 in order to input the confirmation number. In the event that user B memorised the confirmation number displayed on the liquid crystal display 13 and later called the telephone transfer server 20 from another location, a later-described verification interactive voice response (hereinafter, IVR) process showing that the confirmation number does not match is highly likely to prevent the call by user B from being transferred to the fixed telephone 30 belonging to user A.

The display unit 10 also has a non-diagrammed device number allocated thereto, in addition to the unique ID. As described above, the display unit 10 is manufactured in plurality, and each display unit has a different device number allocated thereto. The device number is, for example, written on a sheet of paper enclosed with the display unit 10, written on a package containing the display unit 10, or otherwise provided to user A. Unlike the unique ID, the device number is made visible to user A. The device number of the display unit 10 is a ten-digit number such as 7183010314. The device number is used when user A registers the telephone number of the fixed telephone 30 with the telephone transfer server 20.

Thus, every time the button 12 is pressed, the display unit 10 displays a different confirmation number on the liquid crystal display 13, according to the unique ID of the display unit 10 and the current timestamp. Also, the display unit 10 has no communication function and realises functions with a simple configuration.

(2-2. Telephone Transfer Server 20 Configuration)

The internal configuration of the telephone transfer server 20 is described next, with reference to FIGS. 4, 5A, 5B, 6, and 7.

Figure 4:
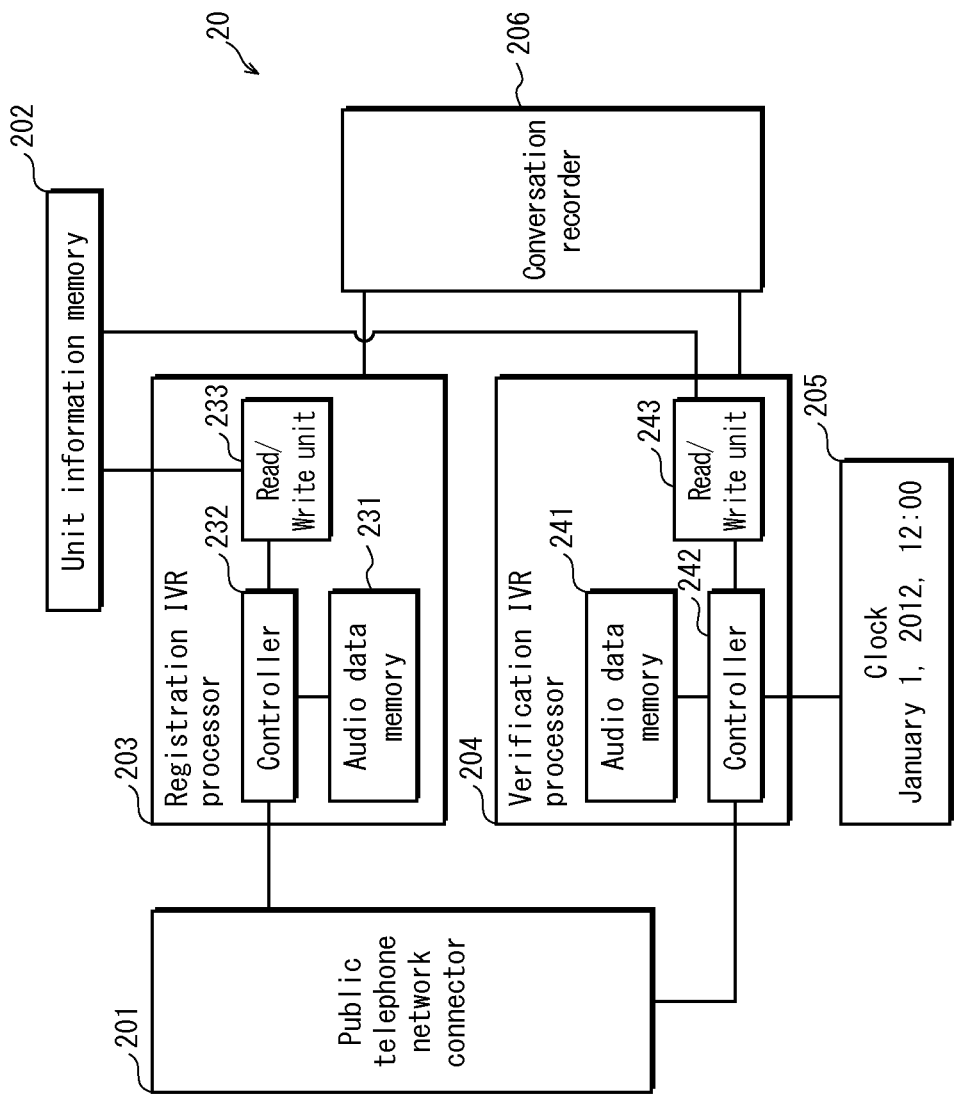
FIG. 4 is a block diagram illustrating the internal configuration of a telephone transfer server 20.

FIG. 4 is a functional block diagram showing the internal configuration of the telephone transfer server 20. As shown, the telephone transfer server 20 includes a public telephone network connector 201, a unit information memory 202, a registration IVR processor 203, a verification IVR processor 204, a clock 205, and a conversation recorder 206. Specifically, the telephone transfer server 20 is a computer system that includes a CPU, ROM, RAM, a hard-disk drive (hereinafter, HDD), and so on.

The public telephone network connector 201 is connected to the public telephone network 50 and makes a line connection between the fixed telephone 30 and the mobile telephone 40.

The unit information memory 202 is, for example, an HDD storing a device table 210, shown in FIG. 5A, and a registration table 220, shown in FIG. 5B.

The device table 210 is a table registering a plurality of device information entries. As shown in FIG. 5A, each device information entry includes a device number and a unique ID for a display unit that has been manufactured legitimately. The device table 210 is written into the unit information memory 202 after a plurality of display units have been manufactured, once the device number and unique ID have been respectively allocated to each display unit. The device numbers are generated when the display units are manufactured, such that a different device number is uniquely generated for each display unit. Similarly, the unique ID is generated when the display units are manufactured, such that a different unique ID is uniquely generated for each display unit. The device table 210 is used in the later-described registration IVR process and verification IVR process.

The registration table 220 is a table registering a plurality of registration information entries. As shown in FIG. 5B, each registration information entry includes a device number, a registration number, a transfer destination telephone number, and a timestamp correction value. The registration information is generated through the registration IVR process, when the user registers a home telephone number as the transfer destination telephone number. The registration table 220 is used in the later-described verification IVR process.

As shown in FIG. 4, the registration IVR processor 203 includes an audio data memory 231, a controller 232, and a read/write unit 233. The registration IVR processor stores a registration IVR program. The CPU executes the registration IVR program in RAM to perform the registration IVR process through coordination of the audio data memory 231, the controller 232, and the read/write unit 233. The registration IVR process involves registering the telephone number of the fixed telephone 30 in association with the device number and so on of the display unit 10.

As shown in FIG. 6, the audio data memory 231 stores response messages, each associated with a number 1 through 13. The response messages are audio data intended for playback during the registration IVR process.

The response message associated with number 1 is "Welcome to transfer service registration. Please activate caller ID and call again."

The response message associated with number 2 is "Welcome to transfer service registration. Enter the device number on your display unit and press the pound key when finished."

The response message associated with number 3 is "Your device number is invalid. Enter the device number on your display unit and press the pound key when finished."

The response message associated with number 4 is "Your device number is invalid. Please start over."

The response message associated with number 5 is "Press 1 to register, or press 2 to cancel a registration."

The response message associated with number 6 is "Your registration number is ######. Write this number on your display unit. Press 1 to hear your number again, press the pound key to continue."

The response message associated with number 7 is "For confirmation, enter your registration number and press the pound key when finished."

The response message associated with number 8 is "Your registration number is incorrect. Please start over."

The response message associated with number 9 is "Transfer service registration complete. To cancel registration, please dial the registration telephone number again. Thank you for using the service."

The response message associated with number 10 is "To cancel your registration, enter your registration number and press the pound key when finished."

The response message associated with number 11 is "Your registration number is incorrect. Enter your registration number and press the pound key when finished."

The response message associated with number 12 is "Your registration number is incorrect. Please start over."

The response message associated with number 13 is "Transfer service cancellation complete. To register again, please dial the registration telephone number. Thank you for using the service."

The controller 232 makes a determination regarding a Dual-Tone Multi-Frequency (hereinafter, DTMF) tone received from the fixed telephone 30 and selects a response message for playback according to determination results. The controller 232 plays back the selected response message by reading from the audio data memory 231. The controller 232 also generates registration information and registers the registration information so generated in the registration table 220 of the unit information memory 202. In addition, the controller 232 deletes previously registered registration information.

The read/write unit 233 reads information from the unit information memory 202 and also writes information to the unit information memory 202. In addition, the read/write unit 233 reads information from the conversation recorder 206 and also writes information to the conversation recorder 206. In the following description, information is assumed to be read and written to and from the unit information memory 202 and the conversation recorder 206 by the controller 232 via the read/write unit 233, even where not specifically noted.

As shown in FIG. 4, the verification IVR processor 204 includes an audio data memory 241, a controller 242, and a read/write unit 243. The verification IVR processor 204 stores a verification IVR program. The CPU executes the verification IVR program in RAM to perform the verification IVR process through coordination of the audio data memory 241, the controller 242, and the read/write unit 243.

The verification IVR process uses information input through the mobile telephone 40 to determine whether or not user B has actually come to the home of user A, and connects the mobile telephone 40 to the fixed telephone 30 only in the affirmative case.

The verification IVR program includes the same pseudo-random number generation algorithm used by the pseudo-random number generator 105 of the display unit 10.

As shown in FIG. 7, the audio data memory 241 stores response messages, each associated with a number 1 through 10. The response messages are audio data intended for playback during the verification IVR process.

The response message associated with number 1 is "Welcome to the transfer service menu. Please activate caller ID and call again."

The response message associated with number 2 is "Welcome to the transfer service menu. Enter the registration number on the display unit and press the pound key when finished."

The response message associated with number 3 is "Invalid registration number. Enter the registration number on the display unit and press the pound key when finished.".

The response message associated with number 4 is "Invalid registration number. Please start over."

The response message associated with number 5 is "Press the button on the display unit. Enter the confirmation number that appears on the liquid crystal display and press the pound key when finished."

The response message associated with number 6 is "Verification unsuccessful. Please start over."

The response message associated with number 7 is "Verification complete. Your call is being transferred. Please hold."

The response message associated with number 7' is "Verification complete. Your call is being dialed. Please hold."

The response message associated with number 8 is "The transfer destination is busy. Please start over."

The response message associated with number 9 is "You have one minute to speak."

The response message associated with number 10 is "The transfer destination is not responding. Please start over."

The audio data memory 241 of the present Embodiment need not necessarily store the response message associated with number 7'. The response message associated with number 7' is discussed later in Variation (4), and pertains to using a short message service (hereinafter, SMS) when connecting the fixed telephone 30 and the mobile telephone 40.

The controller 242 makes a determination regarding a DTMF tone received from the mobile telephone 40 and selects a response message for playback according to determination results. The controller 242 plays back the selected response message by reading from the audio data memory 241.

The read/write unit 243 reads information from the unit information memory 202 and also writes information to the unit information memory 202. In addition, the read/write unit 243 reads information from the conversation recorder 206 and also writes information to the conversation recorder 206. In the following description, information is assumed to be read and written to and from the unit information memory 202 and the conversation recorder 206 by the controller 242 via the read/write unit 243, even where not specifically noted.

The clock 205 measures the current time of day. The clock 205 is able to measure the time to the year, month, day, hour, and minute, like the clock 101 of the display unit 10.

The conversation recorder 206 is, for example, a HDD. The conversation recorder 206 records conversations with the fixed telephone 30 associated with the telephone number in a notification from the fixed telephone 30. The conversation recorder 206 also records conversations with the mobile telephone 40 associated with the telephone number in a notification from the mobile telephone 40.

(3. Operations)

The following describes the operations of the telephone transmission system 1.

(3-1. Overall Process)

Figure 8:
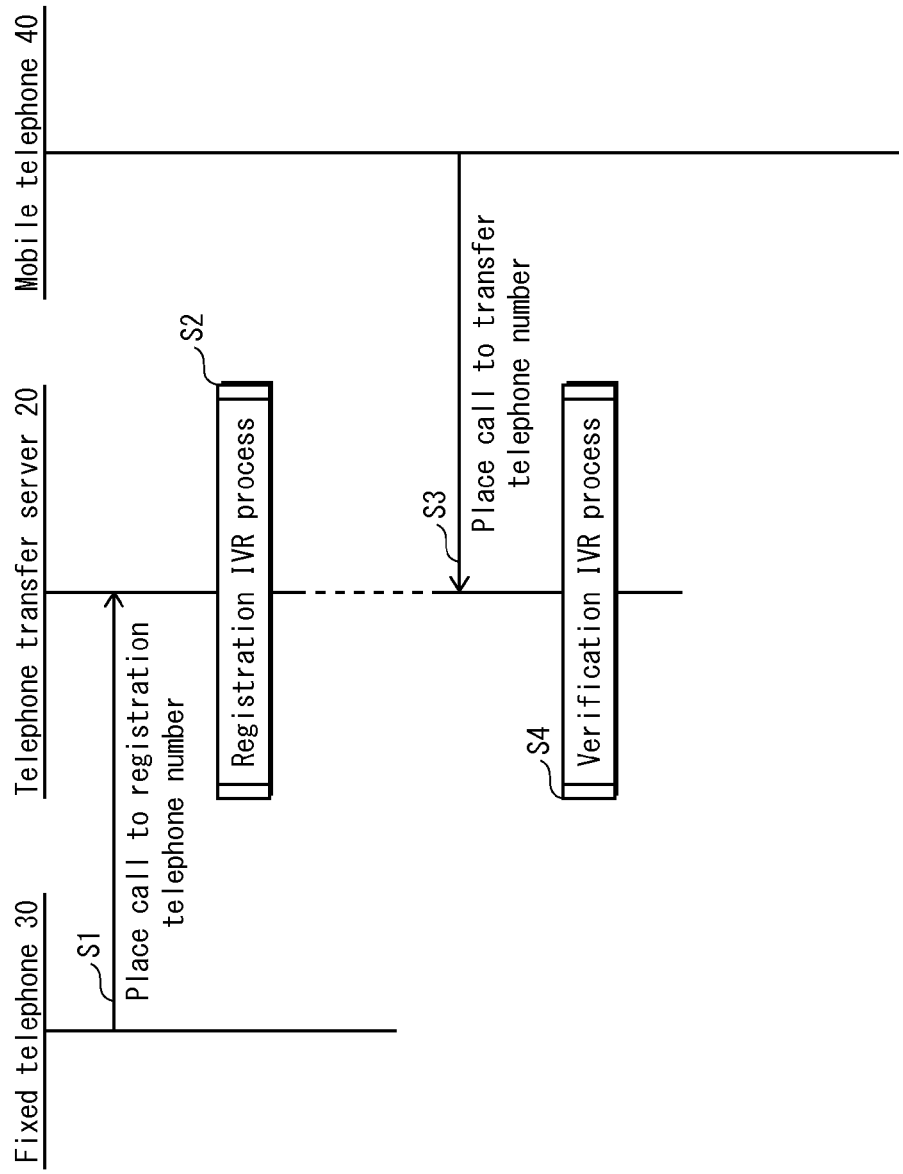
FIG. 8 is a flowchart of overall operations by the telephone transmission system 1.

FIG. 8 is a flowchart of the overall process performed by the telephone transmission system 1. The display unit 10 has no communications capability and thus operates independently of the telephone transfer server 20, the fixed telephone 30, and the mobile telephone 40. As such, FIG. 8 does not list the operations of the display unit 10.

Once the fixed telephone transmits a signal to the registration telephone number (i.e., the telephone number used by the registration IVR processor 203) (step S1), the telephone transfer server 20 performs the registration IVR process (step S2). Subsequently, once the mobile telephone 40 transmits a signal to the transfer telephone number (i.e., the telephone number used by the verification IVR processor 204) (step S3), the telephone transfer server 20 performs the verification IVR process (step S4). The details of steps S2 and S4 will be described later.

(3-2. Display Unit 10 Processing)

Figure 9:
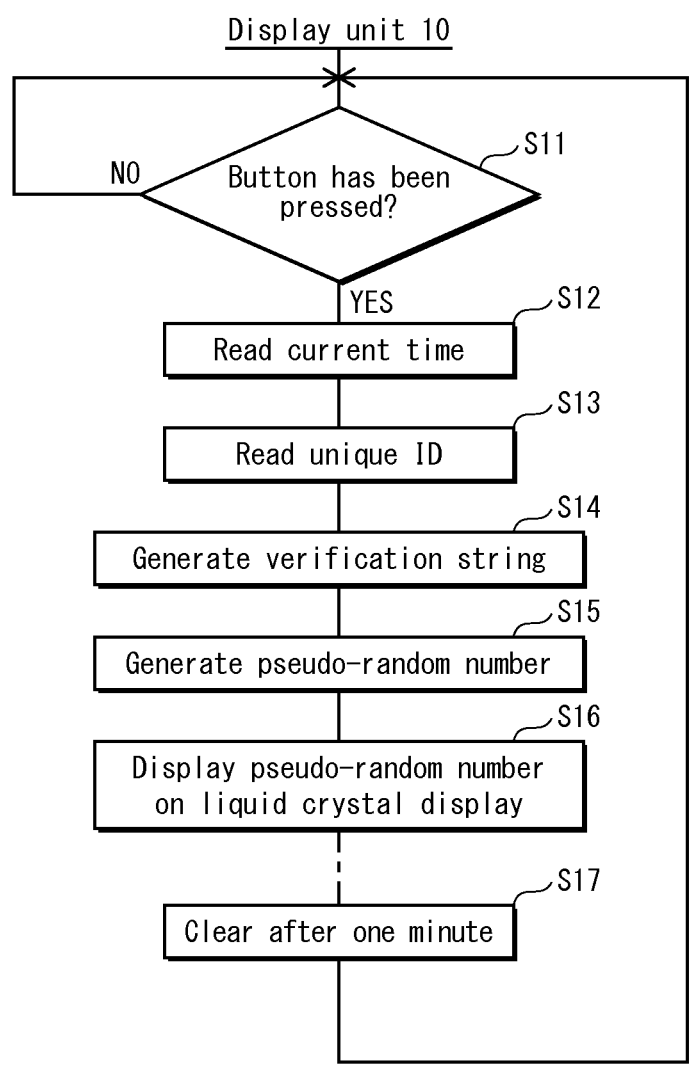
FIG. 9 is a flowchart for the display unit.

FIG. 9 is a flowchart of the operations performed by the display unit 10.

The operation input unit 104 detects a press of the button 12 (YES in step S11) and instructs the pseudo-random number generator 105 to generate a pseudo-random number. The display unit 10 is not active when the button 12 has not been pressed (NO in step S11).

The pseudo-random number generator 105 reads the current time from the clock 101 and generates a timestamp string (step S12). The pseudo-random number generator 105 reads the unique ID from the unique ID memory 103 (step S13). The pseudo-random number generator 105 concatenates the timestamp string generated in step S12 and the unique ID read in step S13 to generate the verification string (step S14).

The pseudo-random number generator 105 executes a hash calculation by applying the one-way hash function to the verification string generated in step S14, thereby generating the pseudo-random number (step S15). The pseudo-random number generator 105 outputs the pseudo-random number generated in step S15 to the display controller 106.

The display controller 106 displays the pseudo-random number generated by the pseudo-random number generator 105 on the liquid crystal display 13 as the confirmation number (step S16). The display controller 106 also clears the display after the confirmation number has been displayed for one minute (step S17). Afterward, the display unit 10 returns to step S11 and continues the process.

(3-3. Detailed Registration IVR Process)

Figure 10:
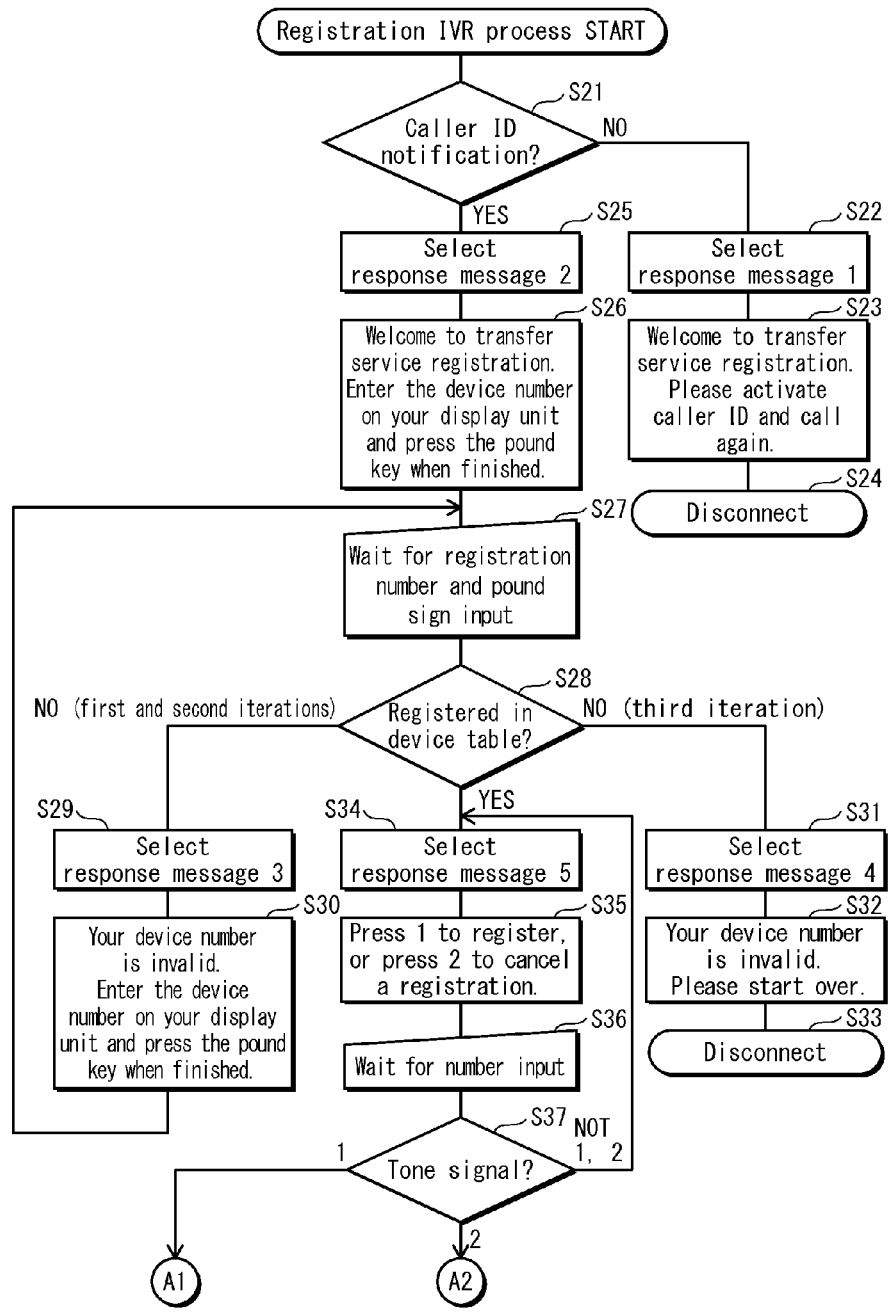
FIG. 10 is a detailed flowchart for a registration IVR process.
Figure 11:
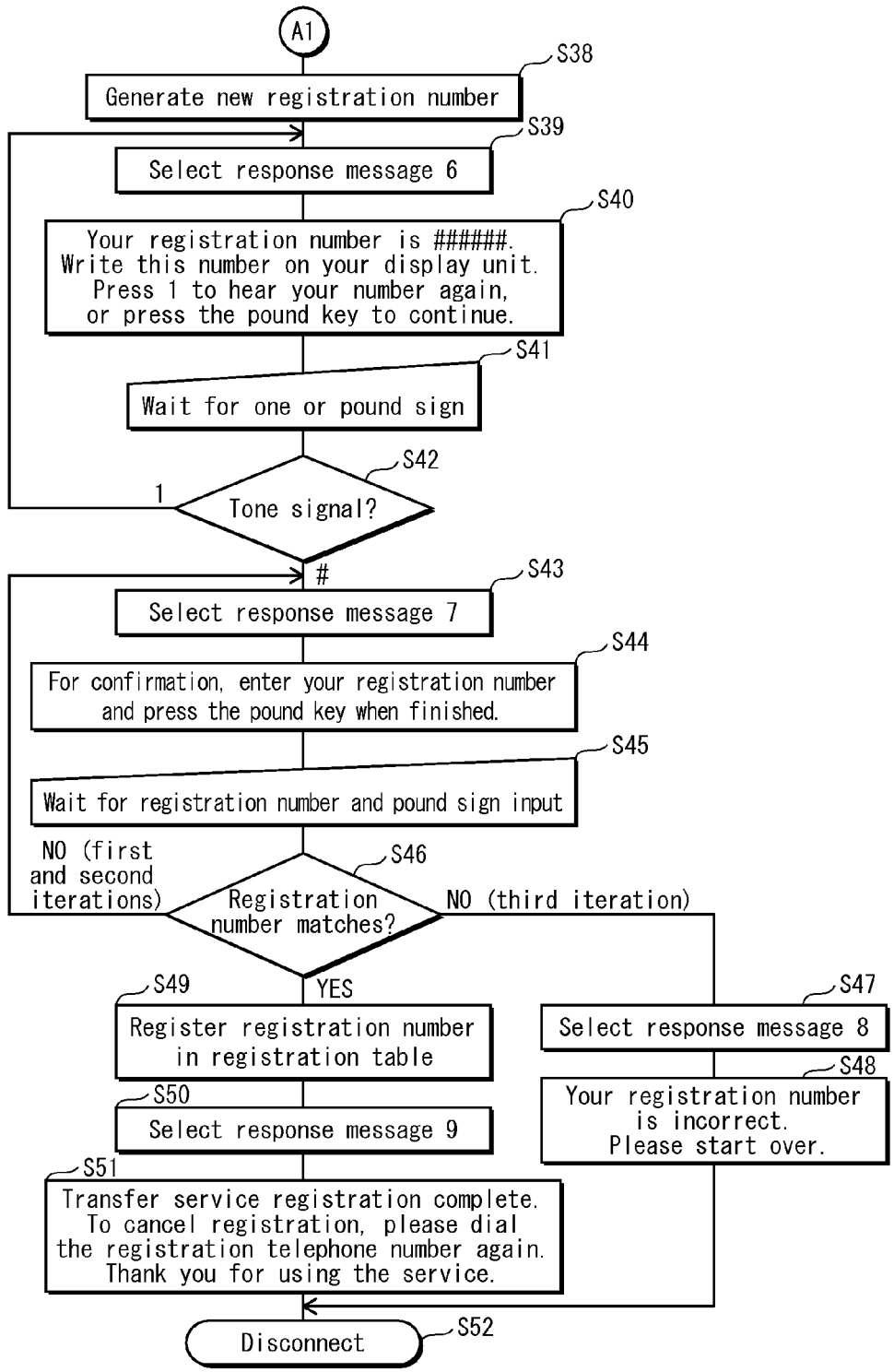
FIG. 11 is a detailed flowchart for the registration IVR process.
Figure 12:
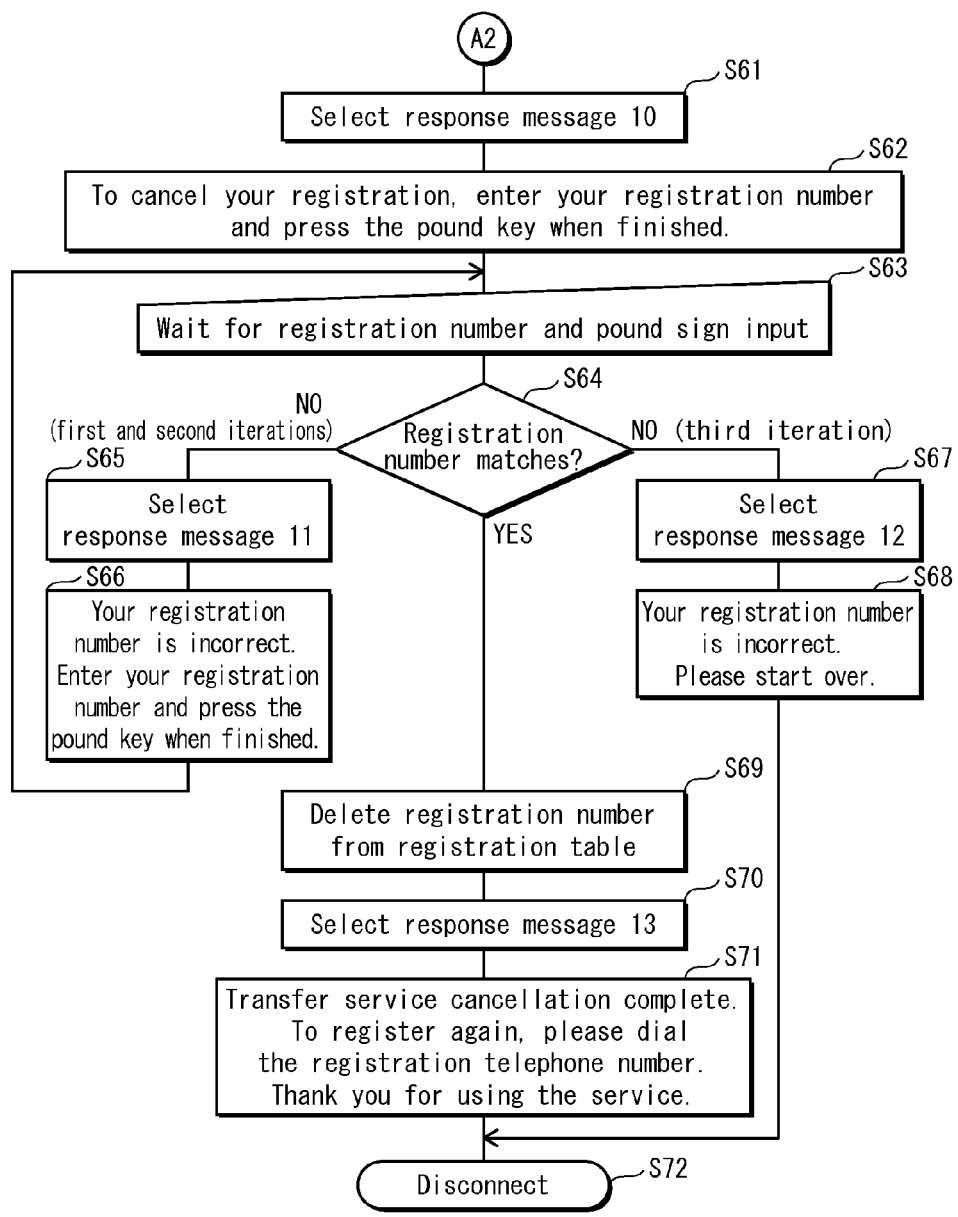
FIG. 12 is a detailed flowchart for the registration IVR process.

FIGS. 10, 11, and 12 are flowchart describing the details of the registration IVR process performed by the telephone transfer server 20 (i.e., the details of step S2).

The registration IVR process starts when a call signal from the fixed telephone reaches the registration telephone number of the telephone transfer server 20. Like the device number of the display unit 10, the registration telephone number may be written on a sheet of paper enclosed with the display unit 10, or may be published on a website belonging to the communications provider that owns the telephone transfer server 20.

Once a signal from the fixed telephone 30 reaches the registration telephone number, the public telephone network connector 201 connects a line between the registration IVR processor 203 and the fixed telephone 30. The controller 232 of the registration IVR processor 203 determines whether or not a caller ID notification is made for the call signal.

In the negative case (NO in step S21), the controller 232 selects response message 1 (step S22), and the audio data memory 231 reads the response message corresponding to number 1. The controller 232 plays back the audio data "Welcome to transfer service registration. Please activate caller ID and call again." (step S23). Afterward, the public telephone network connector 201 disconnects the line connected to the fixed telephone 30, and the controller 232 ends the registration IVR process (step S24).

In the affirmative case (YES in step S21), the controller 232 selects response message 2 (step S25), and the audio data memory 231 reads the response message corresponding to number 2. The controller 232 plays back the audio data "Welcome to transfer service registration. Enter the device number on your display unit and press the pound key when finished." (step S26).

The controller 232 waits for a device number and pound sign (#) to be input by a DTMF tone signal and advances to step S28 once the device number and pound sign have been entered (step S27). Once the device number and pound sign have been entered, the controller 232 determines whether or not the device number that has been entered is registered in the device table 210 (step S28). The controller 232 also temporarily stores determination results.

After one or two iterations of negative determination (NO in step S28 (first and second iterations)), the controller 232 selects response message 3 (step S29). The controller 232 then reads the response message corresponding to number 3 from the audio data memory 231. The controller 232 plays back the audio data "Your device number is invalid. Enter the device number on your display unit and press the pound key when finished." (step S30). Afterword, the process returns to step S27 and continues processing.

After three iterations of negative determination (NO in step S28 (third iteration)), the controller 232 selects response message 4 (step S31). The controller 232 then reads the response message corresponding to number 4 from the audio data memory 231. The controller 232 "Your device number is invalid. Please start over." (step S32). Afterward, the public telephone network connector 201 disconnects the line connected to the fixed telephone 30, and the controller 232 ends the registration IVR process (step S33).

After positive determination (YES in step S28), the controller 232 selects response message 5 (step S34). The controller 232 then reads the response message corresponding to number 5 from the audio data memory 231. The controller 232 plays back the audio data "Press 1 to register, or press 2 to cancel a registration." (step S35).

The controller 232 waits for a number to be input by a DTMF tone signal and advances to step S37 once the number has been entered (step S36). The controller 232 makes a determination regarding the entered number (step S37).

When a number other than one or two has been entered by the DTMF tone signal (NOT 1, 2 in step S37), the process returns to step S34 and continues processing.

When a one has been entered (1 in step S37), the controller 232 generates a registration number a new 10-digit registration number having a unique value not yet registered in the registration table 220, i.e., not duplicating the registration number of another display unit (step S38). The controller 232 then selects response message 6. The controller 232 then reads the response message corresponding to number 6 from the audio data memory 231. The controller 232 plays back the audio data "Your registration number is ######. Write this number on your display unit. Press 1 to hear your number again, or press the pound key to continue." (step S40). The ###### portion listed in step S40 corresponds to audio data for the 10-digit registration number generated in step S38.

The controller 232 waits for a one or a pound sign to be input by the DTM tone signal, then advances to step S42 upon receiving that input (step S41). The controller 232 makes a determination regarding whether the input is a one or a pound sign (step S42).

When the input is a one (1 in step S42), the controller 232 returns to step S39 and continues the process.

When the input is a pound sign (# is step S42), the controller 232 selects response message 7 (step S43). The controller 232 then reads the response message corresponding to number 7 from the audio data memory 231. The controller 232 plays the back audio data "For confirmation, enter your registration number and press the pound key when finished." (step S44).

Afterward, the controller 232 waits for the registration number and pound sign to be input by the DTMF tone signal (step S45), and advances to step S46 upon receiving such input.

Once the registration number and pound sign are entered, the controller 232 determines whether or not the entered registration number matches the registration number generated in step S38 (step S46). The controller 232 also temporarily stores determination results.

When the determination is negative for the first and second iterations (NO step S46 (first and second iterations)), the controller 232 returns to step S43 and continues the process.

When the determination is negative for a third iteration (NO in step S46 (third iteration)), the controller 232 selects response message 8 (step S47). The controller 232 then reads the response message corresponding to number 8 from the audio data memory 231. The controller 232 plays back the audio data "Your registration number is incorrect. Please start over." (step S48). Afterward, the public telephone network connector 201 disconnects the line connected to the fixed telephone 30, and the controller 232 ends the registration IVR process (step S52).

When the determination is affirmative (YES in step S46), the controller 232 generates the registration information.

Specifically, when a signal from the fixed telephone 30 reaches the registration telephone number, the controller 232 generates registration information that includes the device number of the display unit 10 as entered by the fixed telephone 30, the registration number generated in step S38, and the caller ID for the received signal. That is, the telephone number for the fixed telephone 30 serves as the transfer destination telephone number. The controller 232 also initialises the timestamp correction value in the newly-generated registration information to zero.

The controller 232 registers the registration information so generated in the registration table 220 of the unit information memory 202 (step S49).

Next, the controller 232 selects response message 9 (step S50). The controller 232 then reads the response message corresponding to number 9 from the audio data memory 231. The controller 232 plays back the audio data "Transfer service registration complete. To cancel registration, enter your registration number again. Thank you for using the service." (step S51). Afterward, the public telephone network connector 201 disconnects the line connected to the fixed telephone 30, and the controller 232 ends the registration IVR process (step S52).

Step S36 involves waiting for a number to be input by the DTMF tone signal. When a two is input (2 in step S37), the registration IVR processor 203 begins a registration cancellation process.

The controller 232 selects response message 10 (step S61). The controller 232 then reads the response message corresponding to number 10 from the audio data memory 231. The controller 232 plays the back audio data "To cancel your registration, enter your registration number and press the pound key when finished." (step S62).

The controller 232 waits for the registration number and pound sign to be entered by the DTMF tone signal (step S63).

Once the registration number and pound sign are entered, the controller 232 references the registration table 220 and makes a determination regarding whether or not the input registration number and the device number entered in step S27 are associated (step S64). The controller 232 also temporarily stores determination results.

Here, the controller 232 does not determine whether or not the caller ID number matches the transfer destination telephone number in the registration information. This ensures that a telephone other than the fixed telephone to be registered as the transfer destination telephone number is usable for the registration cancellation process.

After one or two iterations of negative determination (NO in step S64 (first and second iterations)), the controller 232 selects response message 11 (step S65). The controller 232 then reads the response message corresponding to number 11 from the audio data memory 231. The controller 232 plays the back audio data "Your registration number is incorrect. Enter your registration number and press the pound key when finished." (step S66). Afterward, the controller 232 returns to step S63 and continues the process.

After three iterations of negative determination (NO in step S64 (third iteration)), the controller 232 selects response message 12 (step S67). The controller 232 then reads the response message corresponding to number 12 from the audio data memory 231. The controller 232 plays back the audio data "Your registration number is incorrect. Please start over." (step S68). Afterward, the public telephone network connector 201 disconnects the line connected to the fixed telephone 30, and the controller 232 ends the registration IVR process (step S52).

When the determination is affirmative (YES in step S64), the controller 232 deletes the registration information including the registration number and device number from the registration table 220 (step S69).

Next, the controller 232 selects response message 13 (step S70). The controller 232 reads the response message corresponding to number 13 from the audio data memory 231. The controller 232 plays back the audio data "Transfer service cancellation complete. To register again, please dial the registration telephone number. Thank you for using the service." (step S71). Afterward, the public telephone network connector 201 disconnects the line connected to the fixed telephone 30, and the controller 232 ends the registration IVR process (step S72).

(3-4. Detailed Verification IVR Process)

Figure 13:
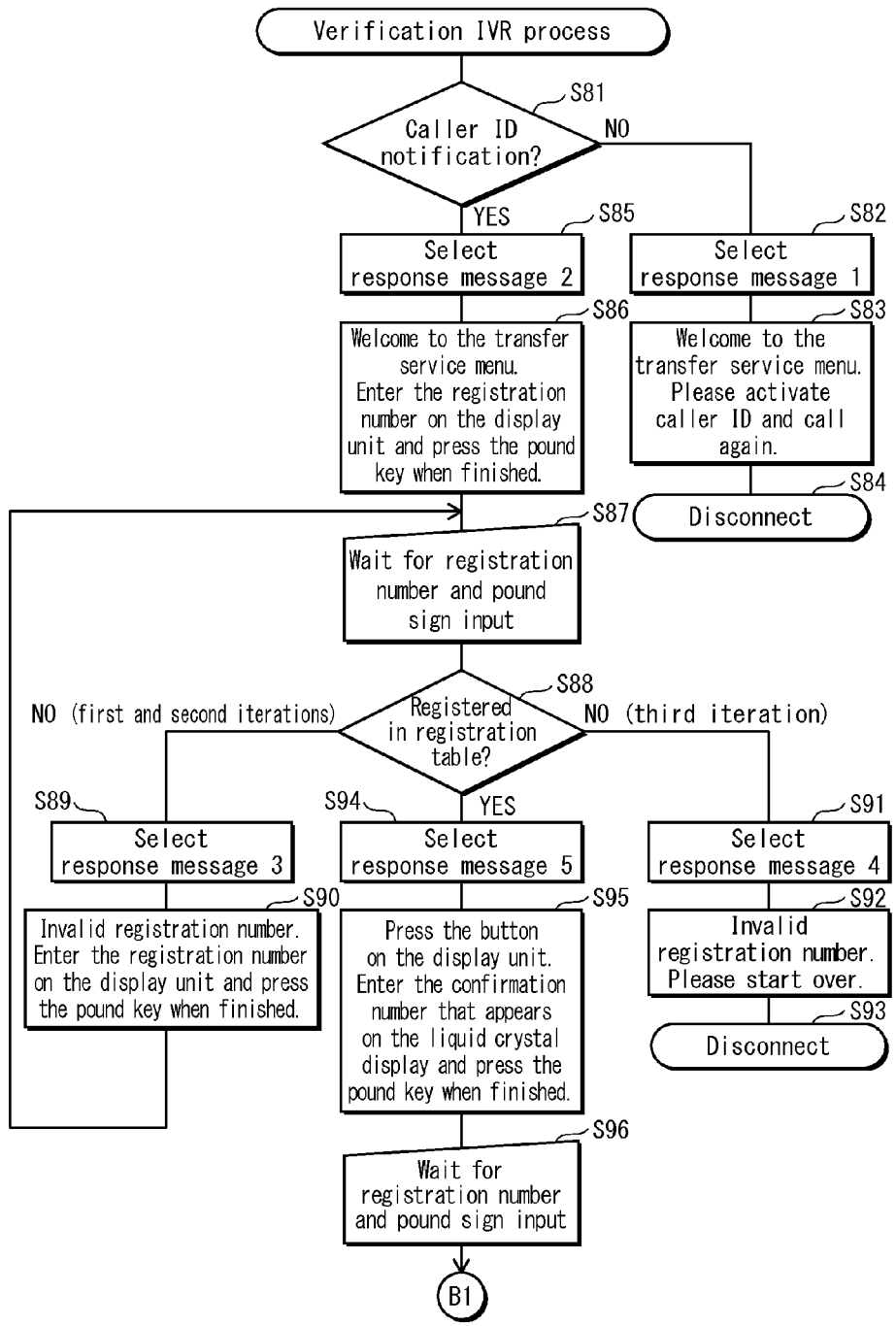
FIG. 13 is a detailed flowchart for a verification IVR process.
Figure 14:
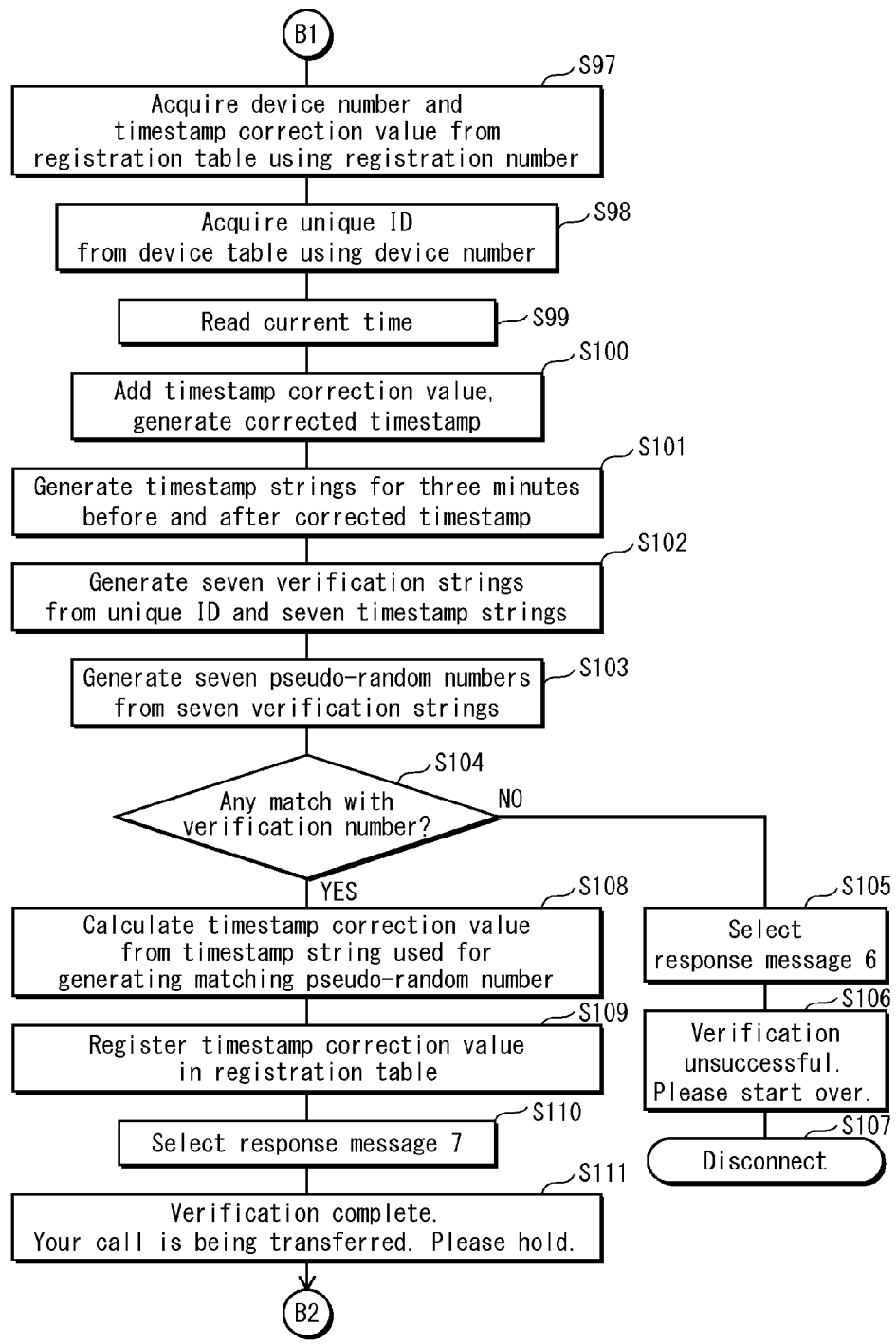
FIG. 14 is a detailed flowchart for the verification IVR process.
Figure 15:
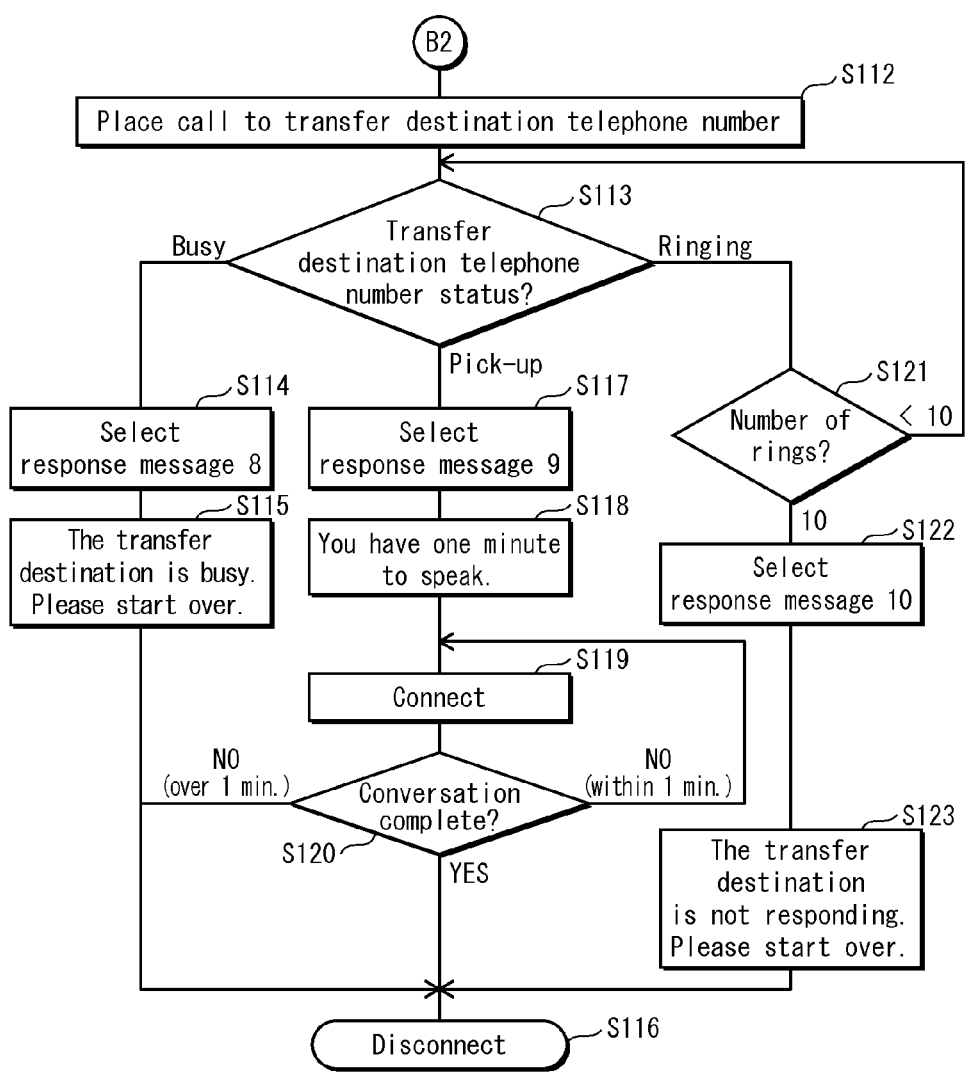
FIG. 15 is a detailed flowchart for the verification IVR process.

FIGS. 13, 14, and 15 are flowcharts describing the details of the verification IVR process performed by the telephone transfer server 20 (i.e., the details of step S24). The verification IVR process starts when a signal from the fixed telephone reaches the verification telephone number of the telephone transfer server 20.

Specifically, the following describes a situation in which a signal is received from the mobile telephone 40 owned by user B. The verification telephone number is written on the main surface of the display unit 10, as illustrated in FIG. 2. User B sees the verification telephone number written on the display unit 10 and makes a call.

Before beginning the verification IVR process, user A has already written the ten-digit registration number obtained from the telephone transfer server 20 in the above-described registration IVR process onto the display unit 10.

Once a signal from the mobile telephone 40 reaches the verification telephone number, the public telephone network connector 201 connects the verification IVR processor 204 and the mobile telephone 40. The controller 242 of the verification IVR processor 204 determines whether or not a caller ID notification is made for the signal, i.e., whether or not the telephone number of the mobile telephone 40 is identified.

In the negative case (NO in step S81), the controller 242 selects response message 1 (step S82). The controller 242 then reads the response message corresponding to number 1 from the audio data memory 241. The controller 242 plays back the audio data "Welcome to the transfer service menu. Please activate caller ID and call again." (step S83). Afterward, the public telephone network connector 201 disconnects the line connected to the mobile telephone 40, and the controller 242 ends the verification IVR process (step S84).

In the affirmative case (YES in step S81), the controller 242 selects response message 2 (step S85). The controller 242 then reads the response message corresponding to number 2 from the audio data memory 241. The controller 242 plays back the audio data "Welcome to the transfer service menu. Enter the registration number on the display unit and press the pound key when finished." (step S86).

The controller 242 waits for the registration number and pound sign to be entered by the DTMF tone signal, and then advances to step S88 once the registration number and pound sign are entered (step S87).

Once the registration number and pound sign are entered, the controller 242 determines whether or not the entered registration number is registered in the registration table 220 (step S88). The controller 242 also temporarily stores determination results.

After one or two iterations of negative determination (NO in step S88 (first and second iterations)), the controller 242 selects response message 3 (step S89). The controller 242 then reads the response message corresponding to number 3 from the audio data memory 241. The controller 242 plays the back audio data "Invalid registration number. Enter the registration number on the display unit and press the pound key when finished." (step S90). Afterward, the controller 242 returns to step S87 and continues the process.

After a third iteration of negative determination (NO in step S88 (third iteration)), the controller 242 selects response message 4 (step S91). The controller 232 then reads the response message corresponding to number 4 from the audio data memory 241. The controller 242 plays back the audio data "Invalid registration number. Please start over." (step S92). Afterward, the public telephone network connector 201 disconnects the line connected to the mobile telephone 40, and the controller 242 ends the verification IVR process (step S93).

When the determination is affirmative (YES in step S88), the controller 242 selects response message 5 (step S94). The controller 242 then reads the response message corresponding to number 5 from the audio data memory 241. The controller 242 plays back the audio data "Press the button on the display unit. Enter the confirmation number that appears on the liquid crystal display and press the pound key when finished." (step S95).

Once user B presses the button 12 on the display unit 10, the confirmation number is displayed on the liquid crystal display 13 of the display unit 10.

The controller 242 waits for a confirmation number and pound sign to be input by a DTMF tone signal and advances to step S97 once the confirmation number has been entered (step S96).

The controller 242 uses the registration number entered in step S87 to search the registration table 220 for registration information that includes the registration number. The controller 242 acquires the device number and the timestamp correction value from the registration information search results (step S97).

The controller 242 uses the device number acquired in step S97 to search the device table 210 for device information that includes that device number. The controller 242 acquires the unique ID from device information search results (step S98).

The controller 242 reads the current time from the clock 205 (step S99). The controller 242 generates a corrected timestamp by adding a timestamp correction value to the current time (step S100).

For example, when the current time read from the clock 205 is Jan. 1, 2012, 12:00 and the timestamp correction value is +1, the controller 242 increments the current time read from the clock 205 by one to generate a corrected timestamp of Jan. 1, 2012, 12:01.

Also, when the current time read from the clock 205 is Apr. 5, 2012, 20:58 and the timestamp correction value is −3, the controller 242 decrements the current time read from the clock 205 by three to generate a corrected timestamp of Apr. 5, 2012, 20:55.

The controller 242 generates a timestamp strings corresponding to the corrected timestamp generated in step S100. In addition, the controller 242 generates timestamp strings corresponding to each of a plurality of offsets from the corrected timestamp generated in step S100, specifically −1 minute, −2 minutes, −3 minutes, +1 minute, +2 minutes, and +3 minutes (step S101).

For example, when the corrected timestamp is Jan. 1, 2012, 12:01, the controller 242 generates seven timestamp strings, specifically 1201011158 (−3 minutes), 1201011159 (−2 minutes), 1201011200 (−1 minute), 1201011201 (corrected timestamp), 1201011202 (+1 minute), 1201011203 (+2 minutes), and 1201011204 (+3 minutes).

The controller 242 then generates seven verification strings, one for each of the seven timestamp strings so generated, by concatenating each timestamp string with the unique ID acquired in step S98 (step S102).

Next, the controller 242 applies the one-way hash function to each of the seven verification strings so generated to generate seven pseudo-random numbers (step S103). The controller 242 compares each of the seven pseudo-random numbers generated in step S103 to the confirmation number received in step S96 and determines whether or not the confirmation number matches any one of the pseudo-random numbers (step S104).

When the determination is negative (NO in step S104), the controller 242 selects response message 6. The controller 242 reads the response message corresponding to number 6 from the audio data memory 241. The controller 242 plays back the audio data "Verification unsuccessful. Please start over." (step S106). Afterward, the public telephone network connector 201 disconnects the line connected to the mobile telephone 40, and the controller 242 ends the verification IVR process (step S107).

In the affirmative case (YES in step S104), the controller 242 calculates a new timestamp correction value using the timestamp string that served to generate the matching pseudo-random number and the timestamp string that served to generate the corrected timestamp (step S108). The controller 242 then overwrites the registration table 220 with the newly-calculated timestamp correction value (step S109).

For example, assume a case where a timestamp string of 1201011203 served to generate the pseudo-random number matching the confirmation number. Further assume that a timestamp string of 1201011201 served to generate the corrected timestamp. This situation signifies that the clock 101 of the display unit 10 is two minutes slower than the clock 205 of the telephone transfer server 20. The controller 242 thus generates a timestamp correction value of −2. This enables the next iteration of the verification IVR process to calculate the corrected timestamp in step S100 with reference to the two minute lag of the clock 101 in the display unit 10.

Next, the controller 242 selects response message 7 (step S110). The controller 242 then reads the response message corresponding to number 7 from the audio data memory 241. The controller 242 plays back the audio data "Verification complete. Your call is being transferred. Please hold." (step S111).

The controller 242 makes a call to the transfer destination telephone number registered in the registration table 220, i.e., to the fixed telephone 30 (step S112). The controller 242 determines the state of the fixed telephone 30 (step S113).

When the fixed telephone 30 is busy (Busy in step S113), the controller 242 selects response message 8 (step S114). The controller 242 then reads the response message corresponding to number 8 from the audio data memory 241. The controller 242 plays back the audio data "The transfer destination is busy. Please start over." (step S115). Afterward, the public telephone network connector 201 disconnects the line connected to the mobile telephone 40, and the controller 242 ends the verification IVR process (step S116).

When the fixed telephone 30 picks up (Pick-up in step S113), the controller 242 selects response message 9 (step S117). The controller 242 then reads the response message corresponding to number 9 from the audio data memory 241. The controller 242 plays back the audio data "You have one minute to speak." (step S118). Afterward, the public telephone network connector 201 connects the fixed telephone 30 and the mobile telephone 40 (step S119). The controller 242 then monitors the elapsed time and conversation status on the connected line (step S120).

When the conversation is complete (YES in step S120), the public telephone network connector 201 disconnects the fixed telephone 30 and the mobile telephone 40, and the controller 242 ends the verification IVR process (step S116).

When the conversation is not complete but one minute has elapsed since connection (NO (over 1 min.) in step S120), the public telephone network connector 201 disconnects the fixed telephone 30 and the mobile telephone 40, and the controller 242 ends the verification IVR process (step S116). When the conversation is not complete and one minute has not yet elapsed since connection (NO (within 1 min.) in step S120), the public telephone network connector maintains the connection between the fixed telephone 30 and the mobile telephone 40.

When the fixed telephone 30 is ringing (Ringing in step S113), the controller 242 monitors the number of rings (step S121). When fewer than 10 rings have occurred (<10 in step S121), the controller 242 returns to step S113 and continues the process. Once a tenth ring has occurred (10 in step S121), the controller 232 selects response message 10 (step S122). The controller 242 then reads the response message corresponding to number 10 from the audio data memory 241. The controller 242 plays back the audio data "The transfer destination is not responding. Please start over." (step S123). Afterward, the public telephone network connector 201 disconnects the line connected to the mobile telephone 40, and the controller 242 ends the verification IVR process (step S116).

(4. Variations)

The telephone transmission system pertaining to the disclosure has been described above with reference to the Embodiment. However, the following variations may also be applied telephone transmission system 1. The present disclosure is not particularly limited to the above-described embodiment of the telephone transmission system 1.

(1) In the above-described Embodiment, the fixed telephone 30 is a fixed unit connected to the public telephone network 50. However, no such limitation is intended. A mobile telephone, owned by user A, connected to the mobile telephone network 60 may replace the fixed telephone 30. Registering the telephone number of the mobile telephone as the transfer destination telephone number enables user B to inform user A of a visit, even when user A happens to be out. Also, the fixed telephone 30 may be an IP telephone connected to an IP telephone network, or a terminal device such as a personal computer or tablet using a VoIP function.

(2) In the above-described Embodiment, the transfer destination telephone number is registered by having user A place a call from the fixed telephone 30 to the registration IVR processor 203 of the telephone transfer server 20. However, no such limitation is intended. For example, user A may use a terminal device connected to the Internet to enter information on a website of the communications provider providing the telephone transfer server 20 and thereby register the transfer destination telephone number.

(3) In the above-described Embodiment, the telephone number used by the verification IVR processor 204 is written on the display unit 10. However, no such limitation is intended.

(4) In the above-described Embodiment, the authentication IVR process involves step S112, where the telephone transfer server 20 places a call to the fixed telephone 30 in order to connect the fixed telephone 30 and the mobile telephone 40. However, no such limitation is intended.

Figure 16:
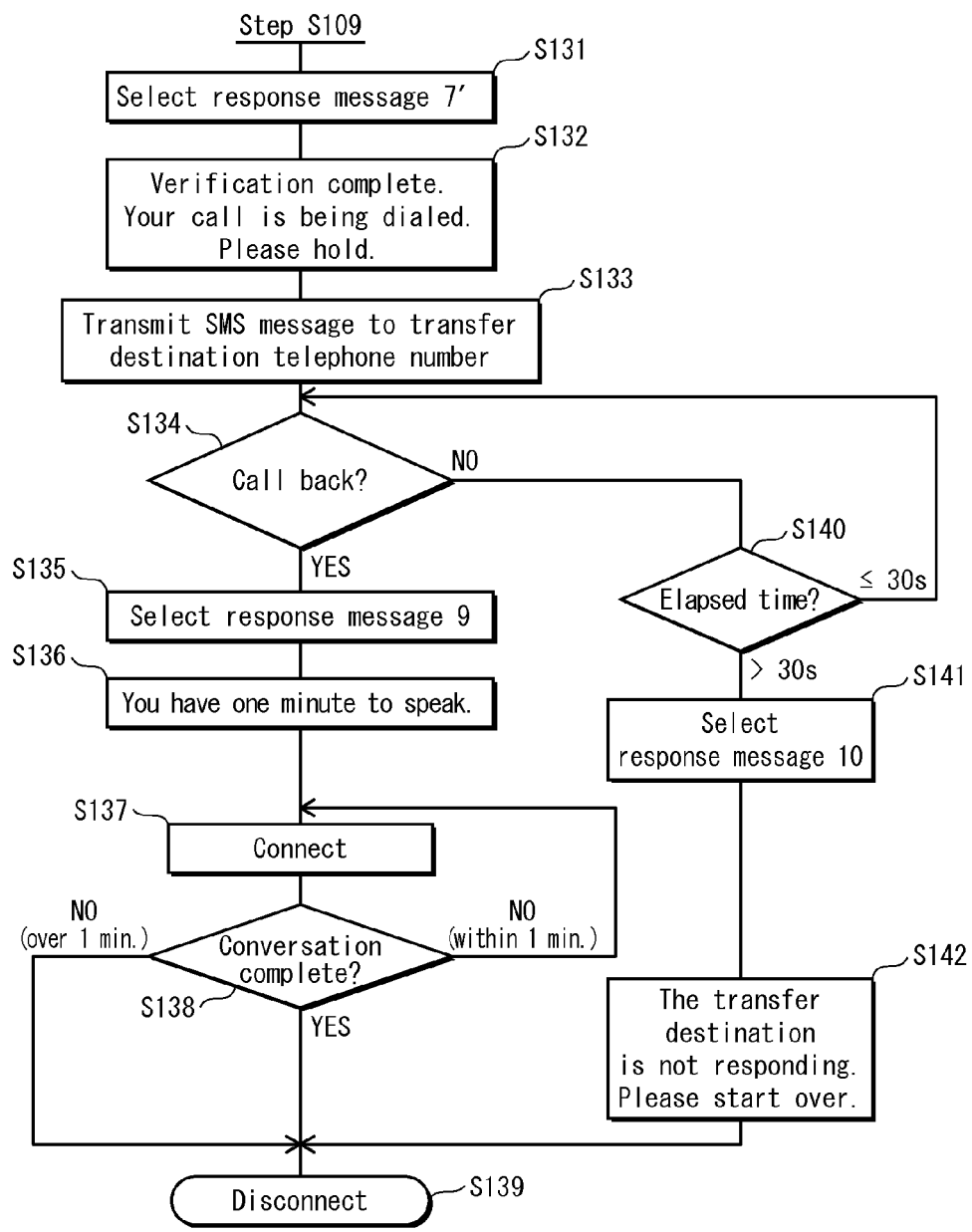
FIG. 16 is a flowchart for a variation using SMS.

The following describes an example in which the fixed telephone 30 and the mobile telephone 40 are connected by using an SMS, with reference to the flowchart of FIG. 16.

The telephone transfer server 20 performs the authentication IVR process of the above-described Embodiment up to step S109. In the present Variation, the controller 242 selects response message 7' instead of response message 7 (step S131). The controller 242 then reads the response message corresponding to number 7' from the audio data memory 241. The controller 242 plays back the audio data "Verification complete. Your call is being transferred. Please hold." (step S132).

Next, the controller 242 transmits an SMS message to the transfer destination telephone number registered in the registration table 220 (step S133). The SMS message reads "You have a visitor. Please call 06-1234-5678." for example. The telephone number 06-1234-5678 listed in the SMS message is the telephone number for the verification IVR processor 204.

Afterward, the controller 242 waits for a call back from the transfer destination telephone number while measuring elapsed time.

Once a call back is made (YES in step S134), the controller 242 selects response message 9 (step S135). Steps S136 through S139 are identical to steps S118 through S116 described with reference to FIG. 15, and explanations thereof are thus omitted.

When no call back is made (NO in step S134) and 30 seconds or less have elapsed (≤30 s in step S140), the controller 242 returns to step S134 and continues the process.

When no call back is made (NO in step S134) and more than 30 second have elapsed (>30 s in step S140), the controller 242 selects response message 10 (step S141). Steps S142 through S139 are identical to steps S123 through S116 described with reference to FIG. 15, and explanations thereof are thus omitted.

(5) In the above-described Embodiment, the display unit 10 includes the liquid crystal display 13 and the generated confirmation number (i.e., the pseudo-random number) is displayed on the liquid crystal display 13. Accordingly, user B see the confirmation number displayed on the liquid crystal display 13 and is able to enter the confirmation number by operating the keys on the mobile telephone 40. However, no such limitation is intended.

The display unit 10 may include a speaker instead of the liquid crystal display 13. The display unit 10 may output a DTMF tone signal representing the generated confirmation number from the speaker. Accordingly, user B is able to use a microphone on the mobile telephone 40 to enter the DTMF tone signal output by the speaker on the display unit 10.

Also, the display unit 10 need not display the confirmation number as digits, but may instead display a barcode readable by the mobile telephone 40. User B reads the barcode using a barcode reader on the mobile telephone 40 or images the barcode with a camera of the mobile telephone 40, thereby entering the confirmation number. In such cases, the telephone transfer server 20 must be able to recreate the confirmation number from the barcode received from the mobile telephone 40.

(6) In the above-described Embodiment, the telephone transmission system display unit 1 describes the display unit 10 being installed at the entrance to the home of user A and enables a telephone line to be connected upon confirming that user B, who owns the mobile telephone 40, has come to the home of user A.

However, the telephone transmission system of the present disclosure is of course not limited in this manner.

For example, the display unit 10 may be installed near an advertising poster in the street or near a product on display, with a message such as "For more information, call 06-1234-5678". Accordingly, a person who is actually standing in front of the poster is connected by telephone. Also, the display unit 10 could be installed as an automated reception attendant for a business, or as an automated night attendant at a police box.

The telephone transmission system pertaining to the present disclosure is a system for connecting a telephone call upon confirming that a person is present near the display unit 10, and thus has many potential applications.

In the above-described Embodiment, user B makes the call to the telephone transfer server 20 using the mobile telephone 40, which is owned by user B, while located in front of the display unit 10. The telephone call charges are paid by user B. The telephone transfer server 20 may instead request a caller ID notification from the mobile telephone 40. The telephone transfer server 20 also has the conversation recorder 206 and records the conversation with the mobile telephone 40. Accordingly, user B is unlikely to make a call to the telephone transfer server 20 as a prank.

(7) The above-described Embodiment and variations may be freely adjusted.

(5. Supplement)

Aspects of the present disclosure are further discussed below, in terms of the telephone transmission system and of the variations and effects thereof.

In one aspect, a telephone transmission system includes a display unit and a telephone transfer server, wherein the display unit includes: a first clock tracking a first clock time; a unique ID memory storing a unique ID; a first pseudo-random number generator generating a first pseudo-random number from the unique ID and the first clock time tracked by the first clock; and a display displaying the first pseudo-random number, and the telephone transfer server includes: a second clock tracking a second clock time; a unit information memory storing the unique ID of the display unit and a telephone number associated with the display unit; a receiver receiving information generated by an operation of a telephone; a second pseudo-random number generator generating, when the receiver receives the information, a second pseudo-random number from the second clock time tracked by the second clock and the unique ID stored in the unit information memory; a determiner making a matching determination to find a match between the information and the second pseudo-random number; and a communication controller connecting the telephone to the telephone number associated with the display unit when the matching determination is successful.

Here, the receiver realises functions of the public telephone network connector 201 and of the verification IVR processor 204 of the above-described Embodiment. The second pseudo-random number generator and the determiner execute functions of the verification IVR processor 204 of the above-described Embodiment. Also, the communication controller realises the functions of the public telephone network connector 201 and of the verification IVR processor 204 of the above-described Embodiment.

According to this configuration, the pseudo-random number is generated with a validity limit from the unique ID of the display unit and the clock time of the clock in the display unit, enabling verification of whether or not the visitor is actually present at the display unit location.

Also, given the lack of need for communication between the display unit and the telephone transfer server or between the display unit and the telephone, there is no need to provide a communication circuit in the display unit. The display unit is configured simply to generate and display the pseudo-random number, enabling low-cost realisation.

Also, the visitor need only make a call to the telephone transfer server, such that the resident is not required to reveal their telephone number to the visitor.

In another aspect, the unit information memory stores the unique ID in association with a valid display unit device number, the telephone transfer server further includes: a registration information receiver receiving a device number of the display unit and the telephone number associated with the display unit; a verifier making a memory determination of whether or not the device number is stored in the unit information memory; a registration number generator generating a registration number that is unique to the display unit when the memory determination is affirmative; and a register registering the registration number and the telephone number in the unit information memory, in association with the unique ID, the receiver further receives the registration number through the operation of the telephone, and the determiner makes the matching determination by reading the unique ID associated with the registration number from the unit information memory, and then using the second clock time with the unique ID that is read.

Here, the registration information receiver realises functions of the public telephone network connector 201 and of the registration IVR processor 203 of the above-described Embodiment. The verifier, the registration number generator, and the register realise functions of the registration IVR processor 203 of the above-described Embodiment. The receiver realises the functions of the public telephone network connector 201 and of the registration IVR processor 203 of the above-described Embodiment.

Accordingly, the telephone transfer server is able to register the telephone number for a legitimate display unit, only.

In a further aspect, the second pseudo-random number generator generates a plurality of verification candidates from the unique ID and each of the second clock time, an earlier clock time preceding the second clock time by a predetermined interval, and a later clock time following the second clock time by the predetermined interval, using an algorithm identical to the first pseudo-random number generator, the determiner makes the matching determination to find a match between any one of the verification candidates and the information, when the matching determination is successful, the determiner determines that the information matches the second pseudo-random number and records a correction value as an offset between the second clock time and a source clock time of the verification candidate of the successful matching determination, and for a subsequent matching determination, the second pseudo-random number generator generates the verification candidates using a corrected clock time obtained by applying the correction value to the second clock time.

Synchronizing the clocks of the display unit and the telephone transfer server is an important aspect of the system. As such, the display unit beneficially includes a timestamp corrector that receives a standard electric wave and corrects the clock. However, in order to reduce the comparatively large electric power consumption required to receive and process the standard electric wave, a display unit such as that of the present disclosure may be driven by a small battery and not include the timestamp corrector.

Thus, the telephone transfer server of the present disclosure is configured as described above to enable the verification process to be performed even in absence of synchronisation with the clock of the display unit. Furthermore, the telephone transfer server adds an offset with respect to the clock of the display unit into subsequent verification processing.

In an additional aspect, the display unit further includes an operator receiving a user operation, and the first pseudo-random number generator generates the first pseudo-random number once the operator receives the user operation.

Accordingly, the display unit only generates and displays the pseudo-random number when a user operation is received. Thus, no electric power is wasted and low electric power consumption is achieved for the display unit.

In another additional aspect, the communication controller connects the telephone to the telephone number registered in the unit information memory by placing a call to the telephone number.

Accordingly, the telephone transfer server places the phone call, allowing a high probability of the connection being made in a short time.

In this situation, the cost associated with making the call from the telephone transfer server to the telephone number is charged to the telephone transfer server. Also, the following alternative configuration is applicable.

In an alternative aspect, the communication controller uses a Short Message Service to make a call notification to the telephone number registered in the unit information memory, and connects the telephone to the telephone number upon receiving a call back from the telephone number.

Accordingly, there is no need for the telephone transfer server to place a call to the telephone number. As such, no fees are charged to the telephone transfer server.

In yet another aspect, a telephone transfer server includes: a clock tracking a clock time; a unit information memory storing a unique ID of a display unit and a telephone number associated with the display unit; a receiver receiving information generated by an operation of a telephone; a pseudo-random number generator generating, when the receiver receives the information, a pseudo-random number from the clock time tracked by the clock and the unique ID stored in the unit information memory; a determiner using the clock time and the unique ID stored in the unit information memory to make a determination of whether or not the information indicates the pseudo-random number; a determiner making a matching determination to find a match between the information and the pseudo-random number; and a communication controller connecting the telephone to the telephone number associated with the display unit when the matching determination is successful.

Accordingly, the telephone transmission server verifies information received from a telephone by using a pseudo-random number generated from a clock time tracked by a clock and from a unique ID of the display unit. This enables verification of whether or not the visitor is actually near the display unit.

Also, the visitor need only make a call to the telephone transfer server, such that the resident is not required to reveal their telephone number to the visitor.

In yet a further, a display unit used in a telephone transmission system includes: a clock tracking a clock time; a unique ID memory storing a unique ID; a pseudo-random number generator generating a pseudo-random number from the unique ID and the clock time tracked by the clock; and a display displaying the pseudo-random number.

Accordingly, a pseudo-random number is generated from a timestamp measured by a clock and from a unique ID of the display unit. The pseudo-random number is then used for a verification process. This enables verification of whether or not the visitor is actually near the display unit. In addition, the display unit has no communication circuit and is configured simply to generate and display the pseudo-random number, enabling low-cost realisation.

REFERENCE SIGNS LIST

1 Telephone transmission system
10 Display unit
12 Button
13 Liquid crystal display
20 Telephone transfer server
30 Fixed telephone
40 Mobile telephone
50 Public telephone network
60 Mobile telephone network
101 Clock
102 Clock corrector
103 Unique ID memory
104 Operation input unit
105 Pseudo-random number generator
106 Display controller
201 Public telephone network connector
202 Unit information memory
203 Registration IVR processor
204 Verification IVR processor
205 Clock
206 Conversation recorder
231 Audio data memory
232 Controller
233 Read/write unit
241 Audio data memory
242 Controller
243 Read/write unit

The invention claimed is:

1. A telephone transmission system comprising a display unit and a telephone transfer server, wherein
the display unit includes:
a first clock tracking a first clock time;
a unique ID memory storing a unique ID;
a first pseudo-random number generator generating a first pseudo-random number from the unique ID and the first clock time tracked by the first clock; and
a display displaying the first pseudo-random number, and the telephone transfer server includes:
- a second clock tracking a second clock time;
- a unit information memory storing the unique ID of the display unit and a telephone number associated with the display unit;
- a receiver receiving information generated by an operation of a telephone;
- a second pseudo-random number generator generating, when the receiver receives the information, a second pseudo-random number from the second clock time tracked by the second clock and the unique ID stored in the unit information memory;
- a determiner making a matching determination to find a match between the information and the second pseudo-random number; and
- a communication controller connecting the telephone to the telephone number associated with the display unit when the matching determination is successful.

2. The telephone transmission system of claim 1, wherein the unit information memory stores the unique ID in association with a valid display unit device number,
the telephone transfer server further includes:
- a registration information receiver receiving a device number of the display unit and the telephone number associated with the display unit;
- a verifier making a memory determination of whether or not the device number is stored in the unit information memory;
- a registration number generator generating a registration number that is unique to the display unit when the memory determination is affirmative; and
- a register registering the registration number and the telephone number in the unit information memory, in association with the unique ID, the receiver further receives the registration number through the operation of the telephone, and
the determiner makes the matching determination by reading the unique ID associated with the registration number from the unit information memory, and then using the second clock time with the unique ID that is read.

3. The telephone transmission system of claim 2, wherein the second pseudo-random number generator generates a plurality of verification candidates from the unique ID and each of the second clock time, an earlier clock time preceding the second clock time by a predetermined interval, and a later clock time following the second clock time by the predetermined interval, using an algorithm identical to the first pseudo-random number generator,
the determiner makes the matching determination to find a match between any one of the verification candidates and the information,
when the matching determination is successful, the determiner determines that the information matches the second pseudo-random number and records a correction value as an offset between the second clock time and a source clock time of the verification candidate of the successful matching determination, and
for a subsequent matching determination, the second pseudo-random number generator generates the verification candidates using a corrected clock time obtained by applying the correction value to the second clock time.

4. The telephone transmission system of claim 2, wherein the display unit further includes an operator receiving a user operation, and
the first pseudo-random number generator generates the first pseudo-random number once the operator receives the user operation.

5. The telephone transmission system of claim 2, wherein the communication controller connects the telephone to the telephone number registered in the unit information memory by placing a call to the telephone number.

6. The telephone transmission system of claim 2, wherein the communication controller uses a Short Message Service to make a call notification to the telephone number registered in the unit information memory, and connects the telephone to the telephone number upon receiving a call back from the telephone number.

7. A telephone transmission server, comprising:
a clock tracking a clock time;
a unit information memory storing a unique ID of a display unit and a telephone number associated with the display unit;
a receiver receiving information generated by an operation of a telephone;
a pseudo-random number generator generating, when the receiver receives the information, a pseudo-random number from the clock time tracked by the clock and the unique ID stored in the unit information memory;
a determiner using the clock time and the unique ID stored in the unit information memory to make a determination of whether or not the information indicates the pseudo-random number;
a determiner making a matching determination to find a match between the information and the pseudo-random number; and
a communication controller connecting the telephone to the telephone number associated with the display unit when the matching determination is successful.

8. A display unit constituting a telephone transmission system in combination with a telephone transmission server, comprising:
a first clock tracking a first clock time;
a unique ID memory storing a unique ID;
a first pseudo-random number generator generating a first pseudo-random number from the unique ID and the first clock time tracked by the first clock; and
a display displaying the first pseudo-random number, wherein
the telephone transfer server includes:
- a second clock tracking a second clock time;
- a unit information memory storing the unique ID of the display unit and a telephone number associated with the display unit;
- a receiver receiving information generated by an operation of a telephone;
- a second pseudo-random number generator generating, when the receiver receives the information, a second pseudo-random number from the second clock time tracked by the second clock and the unique ID stored in the unit information memory;
- a determiner making a matching determination to find a match between the information and the second pseudo-random number; and
- a communication controller connecting the telephone to the telephone number associated with the display unit when the matching determination is successful.

* * * * *